United States Patent
Bhatnagar et al.

(10) Patent No.: US 11,729,080 B2
(45) Date of Patent: Aug. 15, 2023

(54) AGENTLESS METHOD TO AUTOMATICALLY DETECT LOW LATENCY GROUPS IN CONTAINERIZED INFRASTRUCTURES

(71) Applicant: VMWARE, INC., Palo Alto, CA (US)

(72) Inventors: Yash Bhatnagar, Bangalore (IN); Naina Verma, Bangalore (IN); Chaitanya Krishna Mullangi, Bangalore (IN); Chandrashekhar Jha, Bangalore (IN); Amit Kumar, Bangalore (IN)

(73) Assignee: VMware, Inc., Palo Alto, CA (US)

(*) Notice: Subject to any disclaimer, the term of this patent is extended or adjusted under 35 U.S.C. 154(b) by 19 days.

(21) Appl. No.: 17/370,158

(22) Filed: Jul. 8, 2021

(65) Prior Publication Data
US 2022/0368615 A1 Nov. 17, 2022

(30) Foreign Application Priority Data
May 12, 2021 (IN) ............................. 202141021484

(51) Int. Cl.
*G06F 16/25* (2019.01)
*G06F 16/2458* (2019.01)
(Continued)

(52) U.S. Cl.
CPC ...... *H04L 43/0852* (2013.01); *G06F 9/45558* (2013.01); *H04L 41/12* (2013.01);
(Continued)

(58) Field of Classification Search
CPC . H04L 43/0852; H04L 41/12; G06F 9/45558; G06F 2009/4557; G06F 2009/45595
(Continued)

(56) References Cited

U.S. PATENT DOCUMENTS 9,740,368 B1 * 8/2017 Love .................... G06F 3/04817
10,169,169 B1 * 1/2019 Shaikh ................ G06F 11/2094
(Continued)

FOREIGN PATENT DOCUMENTS

CN  108777636 B  *  7/2019  ............. H04L 41/12
CN  114761970 A  *  7/2022  ........... G06N 3/0454

OTHER PUBLICATIONS

Aspnes, "Graph Theory," Yale.edu, available on or before Oct. 6, 2014, retrieved on Oct. 8, 2021, retrieved from URL <http://www.cs.yale.edu/homes/aspnes/pinewiki/GraphTheory.html>, 12 pages.
(Continued)

*Primary Examiner* — David R Lazaro
*Assistant Examiner* — Berhanu Shitayewoldetadik
(74) *Attorney, Agent, or Firm* — Dinsmore & Shohl LLP

(57) ABSTRACT

Agentless method to automatically detect low latency groups in containerized infrastructures includes obtaining information about communication across workloads within a cluster of containers implemented by an operating environment. The information identifies multiple pairs of containers. Each pair includes a network source container and a corresponding network destination container. The information includes, for each pair of containers, a corresponding latency associated with a network call between the network source container and the corresponding network destination container. An undirected graph is generated using the obtained information. The undirected graph represents a node-wide latency within the cluster. Using the undirected graph, nodes within the cluster with a latency less than a threshold latency level are grouped. Grouped nodes with latencies less than the threshold latency level are provided.

21 Claims, 9 Drawing Sheets

(51) Int. Cl.
  *G06F 11/14*   (2006.01)
  *G06F 16/23*   (2019.01)
  *H04L 12/24*   (2006.01)
  *H04L 15/16*   (2006.01)
  *H04L 29/08*   (2006.01)
  *H04L 12/26*   (2006.01)
  *H04L 43/0852* (2022.01)
  *H04L 41/12*   (2022.01)
  *G06F 9/455*   (2018.01)

(52) U.S. Cl.
  CPC ............... *G06F 2009/4557* (2013.01); *G06F 2009/45595* (2013.01)

(58) Field of Classification Search
  USPC ........................................................ 709/224
  See application file for complete search history.

(56) References Cited

U.S. PATENT DOCUMENTS

| | | | | |
|---|---|---|---|---|
| 10,439,881 | B2* | 10/2019 | Choi ................... | H04L 43/0852 |
| 11,487,888 | B1* | 11/2022 | Rotem .................. | G06N 3/065 |
| 2006/0098671 | A1* | 5/2006 | Shachnai ........... | H04Q 11/0062 370/538 |
| 2007/0055558 | A1* | 3/2007 | Shanahan ............. | G06Q 10/06 705/7.26 |
| 2008/0040699 | A1* | 2/2008 | Okada .................... | G06F 30/30 716/108 |
| 2010/0042644 | A1* | 2/2010 | Judy ....................... | G06F 9/451 707/E17.005 |
| 2014/0143407 | A1* | 5/2014 | Zhang ..................... | H04L 67/00 709/224 |
| 2014/0310240 | A1* | 10/2014 | Meng ...................... | G06F 9/466 707/615 |
| 2014/0344207 | A1* | 11/2014 | Maruhashi ............... | G06N 7/01 706/52 |
| 2015/0117216 | A1* | 4/2015 | Anand ................ | H04L 67/1025 370/236 |
| 2015/0271280 | A1* | 9/2015 | Zhang .................... | H04L 67/10 709/224 |
| 2015/0358222 | A1* | 12/2015 | Berger ................... | H04L 69/00 370/252 |
| 2016/0048557 | A1* | 2/2016 | Hall ....................... | G06F 16/22 707/766 |
| 2016/0359705 | A1* | 12/2016 | Parandehgheibi ..... | G06N 99/00 |
| 2017/0177413 | A1* | 6/2017 | Wisniewski .......... | G06F 9/5033 |
| 2018/0287876 | A1* | 10/2018 | Strobel ............... | H04L 67/1004 |
| 2019/0286491 | A1* | 9/2019 | Bohacek ............... | G06F 9/5061 |
| 2019/0370113 | A1* | 12/2019 | Zhao ...................... | G06F 9/545 |
| 2020/0374228 | A1* | 11/2020 | Yang ..................... | H04L 45/123 |
| 2021/0158083 | A1* | 5/2021 | Gan ........................ | G06F 9/455 |
| 2021/0224703 | A1* | 7/2021 | Tsunoda ............. | G06Q 10/0635 |

OTHER PUBLICATIONS

Chagrin, "vSphere 7—Announcing General Availability of th eNew Generation of vSphere," Product Announcements, dated Apr. 2, 2020, retrieved on Oct. 8, 2021, retrieved from URL <https://blogs.vmware.com/vsphere/2020/04/vsphere-7-new-generation-vsphere.html>, 8 pages.

dnsstuff.com [online], "Guide to Network Latency—How to Check, Measure, and Reduce Network Latency," IDNS Stuff, dated Aug. 19, 2019, retrieved on Oct. 8, 2021, retrieved from URL <https://www.dnsstuff.com/network-latency>, 7 pages.

docker.com [online], "Use containers to Build, Share, and Run your applications," available on or before Aug. 8, 2018, retrieved on Oct. 8, 2021, retrieved from URL <https://www.docker.com/resources/what-container>, 6 pages.

Hargrave, "Standard Deviation," Investopedia.com Corporate Finanace and Accounting, dated Apr. 15, 2021, available on or before Aug. 18, 2000, relieved on Oct. 8, 2021, retrieved from URL <https://www.investopedia.com/terms/s/standarddeviation.asp>, 9 pages.

kubernetes.io [online], "What is Kubernetes?" available on or before Apr. 1, 2017, retrieved on Oct. 8, 2021, retrieved from URL <https://kubernetes.io/docs/concepts/overview/what-is-kuberenetes/>, 3 pages.

microservices.io [online], "Pattern: Microservice Architecture," available on or before Apr. 28, 2014, retrieved on Oct. 8, 2021, retrieved from URL <https://microservices.io/patterns/microservices.html>, 6 pages.

otexts.com [online], "Chapter 7 Exponential Smoothing," Forecasting: Principles and Practice, available on or before Apr. 7, 2019, retrieved on Oct. 8, 2021, retrieved from URL <https://otexts.com/fpp2/expsmooth.html>, 2 pages.

vmware.com [online], "vRealize Operations Manager Documentation," available on or before Jun. 24, 2018, retrieved on Oct. 8, 2021, retrieved from URL <https://docs.vmware.com/en/vRealize-Operations-Manager/index.html>, 3 pages.

* cited by examiner

300

| # |
|---|
| $N_1 \rightarrow (N_1N_3)\ (N_2N_4)\ (N_5N_6)\ N_7\ N_8$ |
| $N_2 \rightarrow (N_2N_1N_3)\ (N_4N_6N_5N_7)\ N_8$ |
| $N_3 \rightarrow (N_3N_1)\ (N_2N_4)\ (N_5N_6)\ N_7\ N_8$ |
| $N_4 \rightarrow (N_4N_3N_1N_2)\ (N_5N_6)\ N_7\ N_8$ |
| $N_5 \rightarrow (N_5N_6)\ (N_1N_3)\ (N_2N_4)\ N_7\ N_8$ |
| $N_6 \rightarrow (N_6N_5)\ (N_1N_3)\ (N_2N_4)\ N_7\ N_8$ |
| $N_7 \rightarrow (N_7N_6N_5)\ (N_1N_3)\ (N_2N_4)\ N_8$ |
| $N_8 \rightarrow (N_8N_5N_6N_7)\ (N_1N_3)\ (N_2N_4)$ |

| DISTINCT GROUPS | LATENCY RATIO | |
|---|---|---|
| $(N_1N_3)$ | $\frac{1}{9}$ | 0.1111111111 |
| $(N_2N_1N_3)$ | $\frac{3}{11}$ | 0.2727272727 |
| $(N_2N_4)$ | $\frac{5}{27}$ | 0.1851851852 |
| $(N_4N_3N_1N_2)$ | $\frac{7}{23}$ | 0.3043478261 |
| $(N_5N_6)$ | $\frac{1}{20}$ | 0.05 |
| $(N_4N_6N_5N_7)$ | $\frac{12}{18}$ | 0.6666666667 |
| $(N_7N_6N_5)$ | $\frac{6}{18}$ | 0.3333333333 |
| $(N_8N_5N_6N_7)$ | $\frac{10}{21}$ | 0.476109 |
| $N_7$ | 0 | 0 |
| $N_8$ | 0 | 0 |

FIG. 4

AGENTLESS METHOD TO AUTOMATICALLY DETECT LOW LATENCY GROUPS IN CONTAINERIZED INFRASTRUCTURES

RELATED APPLICATIONS

Benefit is claimed under 35 U.S.C. 119(a)-(d) to Foreign Application Serial No. 202141021484 filed in India entitled "AGENTLESS METHOD TO AUTOMATICALLY DETECT LOW LATENCY GROUPS IN CONTAINERIZED INFRASTRUCTURES", on May 12, 2021, by VMware, Inc., which is herein incorporated in its entirety by reference for all purposes.

TECHNICAL FIELD

The present disclosure relates generally to network-based computing, and, more particularly, to methods and systems to identify clusters of machines with low latency.

BACKGROUND

Virtualizing computer systems provides benefits such as the ability to execute multiple computer systems on a single hardware computer, replicating computer systems, moving virtual machines (VMs), containers, and/or workloads across multiple hardware computers, and so forth. "Infrastructure-as-a-Service" (IaaS) describes a suite of technologies provided by a service provider as an integrated solution to allow for elastic creation of a virtualized, networked, and pooled computing platform (cloud computing platform). "Platform-as-a-Service" (PaaS) is a category of cloud computing services that allows users to provision, instantiate, run and manage a modular bundle that includes a computing platform and one or more applications without the complexity of building and maintaining the infrastructure associated with doing so. Enterprises may use IaaS or PaaS as a business-internal organizational cloud computing platform (private cloud) that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc. The racks may be used to run VMs that execute workloads, some of which communicate with other workloads within the same rack and/or across different racks which may be co-located in a same facility or located in different facilities.

Containerization is a technique to isolate services running on the same hardware into respective executing environments. A container can be used to place an application or program and its dependencies (e.g., libraries, drivers, configuration files, etc.) into a single package that executes as its own executable environment on hardware. A containerized service from one container restricts containerized services from other containers from accessing its resources. Containerization provides security and scalable resource usage in a multi-service environment.

SUMMARY

The present disclosure describes an agentless method and system to automatically detect low latency groups in containerized infrastructures.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an example of a node group list including multiple groups of nodes generated by the system of FIG. 1.

FIG. 4 is an example of a table showing latency ratios of node groups in the node group list of FIG. 3.

Like reference numbers and designations in the various drawings indicate like elements.

DETAILED DESCRIPTION

Containerized infrastructures involve lightweight applications having a dense web of interactions among them. In such systems, a bottleneck that determines overall responsiveness is the time spent on communication among peers, especially when the applications have latency delays across them. In container operating environment systems, underlying nodes that run workloads are assumed to be homogeneous and equally separated in terms of network, i.e., inherent latency delays across any two given nodes are similar. The homogeneity eliminates the need to consider network latencies within a single cluster when placing workload and evaluating replication strategies.

For private cloud and managed infrastructures, nodes are not homogeneous and latencies are affected by factors including communication across physical hubs, hosts, data centers, etc. Thus, application performance depends on the way in which the applications are running on the nodes. For example, performance of two workloads interacting with each other when running on nodes that have low latency among them will be better than the opposite case.

This disclosure describes an agentless, data-driven system that automatically detects heterogeneous hubs of low latency and performs a cost-benefit analysis to recommend appropriate replication and migration strategies to improve workload performance and reduce infrastructural costs including an interactive show-back mechanism. By "agentless," it is meant that information such as interaction count and latency (described below) is determined, not by deploying an agent at each node in the cluster, but monitoring the network itself. By deliberately avoiding the implementation of agents, problems associated with security, scalability and overhead are eliminated. To summarize, the techniques described in this disclosure enable detecting and discovering network latency barriers within a single containerized infrastructure. The agentless method groups physical nodes in systems together based on a combination of historical and ongoing latencies incurred in the application interactions. The method re-uses the ongoing network calls in the system to divide the system into several partitions of fast physical nodes in terms of network calls. Implementations of the techniques described here can provide users with insights about the best strategies to replicate the services with respect to costs and performance. Implementations also provide a showback mechanism that provides users with an understanding about the network heterogeneity in their physical infrastructures.

Figure 1:
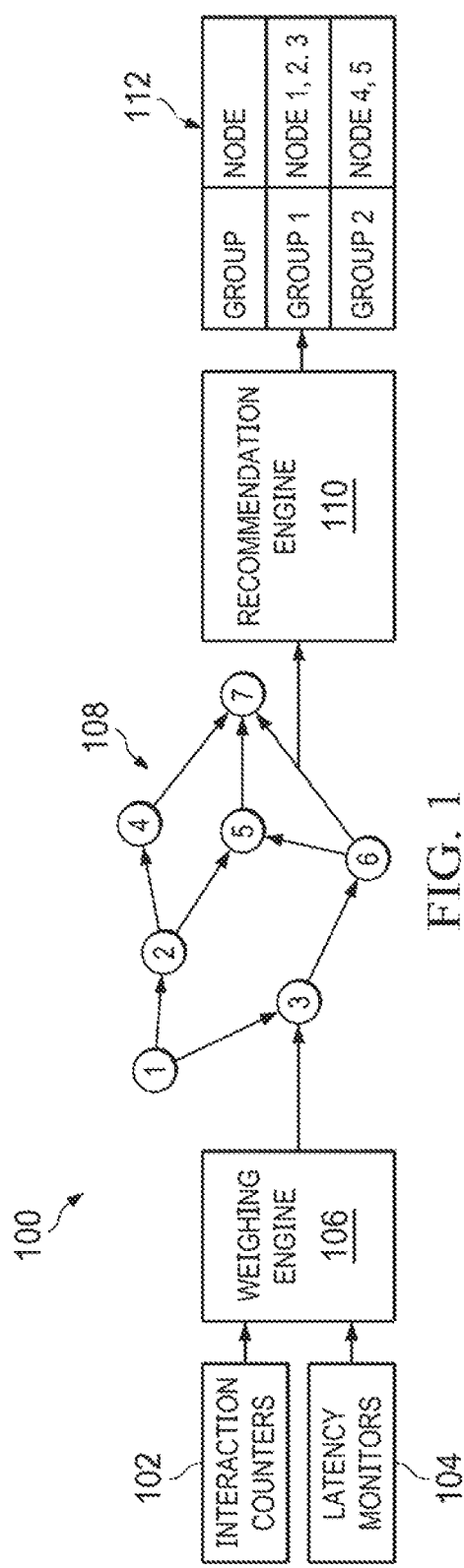
FIG. 1 is an example of a system to group nodes based on latency.

FIG. 1 is an example of a system 100 to group nodes based on latency. As described in further detail below, the system 100 can obtain information about communication across workloads by monitoring the network interactions between containers deployed by an operating environment. To do so, the system 100 can track interaction between the various containers at the application level and also monitor latencies associated with the interactions. In some implementations, each container is operatively coupled to an interaction counter 102 and to a latency monitor 104 (only one shown for illustration). Each interaction counter 102 is configured to monitor for and count network communications including requests and/or any other interactions between services. An interaction can be a request made by a requesting service via a network communication to a serving service to cause the serving service to perform one or more operations and/or provide requested data to the requesting service. An interaction can, alternatively or in addition, be a network communication of data, status information, and/or any other information communicated between services.

The interaction counter 102 of each container outputs an interaction count. The interaction counter 102 can generate a count using application discovery provided by VMWare vRealize® Operations Manager (VROPs) which is a software package that manages operations of virtualized and/or distributed services across physical environments, virtual environments, and cloud environments. Alternatively or in addition, the interaction counter 102 can generate counts using OS-level commands such as netstat —tulpn, etc., to access network logs in containers and/or VMs in which received interactions are logged. To monitor interactions between containerized services, each interaction counter 102 can be implemented in sidecar containers running in pods of the different containers to monitor container-level network interactions in federated clusters of containerized services deployed across the clusters. A sidecar container deployed in a pod is a small, low-resource-consuming container configured to perform limited functionality for a particular purpose, sometimes to enhance operations of one or more corresponding main containers of that same pod. To log interaction counts, the interaction counter 102 monitors network communications received in containers, along with source details. Source details may include a source identifier (e.g., an Internet protocol (IP) address or other network identifier, hardware identifier, etc.) of a source service. To monitor interactions between VM-based services, each interaction counter 102 can be implemented in VM-based services running in VMs alongside other VM-based services for which interactions are monitored.

In some implementations, the interaction counters of all containers deployed by the operating environment generate interaction counts of corresponding services based on the collected interaction data by aggregating counts of network interactions corresponding to those services for corresponding time periods. Times and durations of such time periods are configurable by a user. An example of a data structure of the interaction counts is shown in Table 1, which shows each logged interaction count in association with a network source container and a network destination container.

TABLE 1

Example of a data structure of the interaction counts

| Network Source Container | Network Destination Container | Average Count per hour |
|---|---|---|
| Container A | Container B | 35 |
| Container C | Container B | 140 |
| Container B | Container D | 3 |

Each latency monitor 104 is configured to monitor real-time latencies between containers. Latency is the amount of time that elapses between a first point in time when a service sends a network communication and a subsequent, second point in time when another service receives the network communication. Each latency monitor 104 monitors and logs latencies of inter-container network connections, and can calculate latencies by determining differences between send timestamps and receive timestamps of network communications between the containers. The latency monitor 104 can be deployed as microscopic pods in the container.

In some implementations, the system 100 can poll the interaction counters of all the containers at predefined and/or dynamically defined time intervals to obtain the interaction counts that occurred during a time frame. The system 100 collects latency values of real-time latencies from the latency monitors of all the containers. By doing so, the system 100 obtains information about communication across workloads within a cluster of containers implemented by the operating environment. As described above, the information identifies multiple pairs of containers. Each pair includes a network source container and a corresponding network destination container. The information includes, for each pair of containers, a corresponding latency associated with a network call between the network source container and the corresponding network destination container.

In some implementations, the system 100 mathematically modifies the latencies obtained from the latency monitors to account for errors due to reasons such as intermittent network issues, peak load, etc. For example, the system 100 determines smoothened moving average of the time series data using Eqs. 1 and 2:

$$\text{Smoothed Latency}_i = (\alpha)*\text{Latency}_t + (1-\alpha)*\text{Moving Average}_{i,t} \quad \text{Eq. 1}$$

In Eq. 1, $0 \leq \alpha \leq 1$, and:

$$\text{Moving Average}_{i,t} = \Sigma_{t-i-1}^{t-1} \text{Latency}_t / i \quad \text{Eq. 2}$$

In Eqs. 1 and 2, $\alpha$ is the exponential fraction representing how much the latest value affects the output. Value of this variable is selected based on the kind of data using factors such as standard deviation. Also, to get the smoothened latency, the system 100 determines the moving average of last "i" values, where variable "i" is selected based on heuristics. The exponential smoothening technique described here is but one example of mathematically modifying the latencies. Alternatively or in addition, other mathematical data smoothening techniques may be applied.

Using the information obtained from the interaction counters and the latency monitors of all the containers in the operating environment, the system 100 generates an undirected graph (also known as interaction graph) 108 that represents a node-wide latency within the cluster. The undirected graph represents an overall measure of node-wide latency within a stipulated time period. The graph 108 includes nodes representing containers, and edges between the nodes representing a latency incurred by applications executed by the operating environment when interacting between the two nodes connected by the edge. In some implementations, an edge between two nodes can be identified with a direction of interaction to indicate the source node (the network source container) and the destination node (the network destination container). The source node represents the source container that originated an interaction, and the destination node represents the destination container that received the interaction. The graph 108 is an acyclic graph in that the graph 108 does not include backward loops between nodes.

In some implementations, the system 100 includes a weighing engine 106 operatively coupled to the interaction counters and the latency monitors of the containers. The weighing engine 106 is configured to determine a weight of an edge between two nodes based on a count of interactions for that edge as determined by the interaction counters and based on a latency value of a latency for that edge (e.g., a real-time latency as determined by the latency logs or a smoothened latency determined using Eqs. 1 and 2). Thus, an edge weight of an edge represents a total latency between the two services (e.g., represented as two nodes in the graph 108) taking into account the number of interactions on that edge and the latency of the edge. The weighing engine 106 stores the edge weight values in association with corresponding edges of the graph 108 for subsequent analysis by a recommendation engine 110 (described below) and/or by a user, e.g., to overcome slow deployment performance. For example, the weighing engine 128 can store the edge weight values in a data structure, a data array, in records, etc., in any suitable manner that associates the edge weight value with the corresponding edges.

To generate the graph 108, the weighing engine 106 identifies latency values from a latency table between all containers, and groups containers based on the latency values. In operation, the weighing engine 106 can look up the latency values from the latency table between all pods, and group them based on the source-destination pairs of nodes. The weighing engine 106 can determine a mathematical average of latency values to group the nodes. In some implementations, the weighing engine 106 groups containers based on aggregate latency values. Alternatively or in addition, the weighing engine 106 can implement other mathematical operations, such as, standard deviation, to group containers. The weighing engine 106 can then map all the distinct pairs to an edge between the corresponding vertices representing the node. The weight of the edge is therefore mathematical average of the latency values of all such interactions between applications (historical or current) running on these nodes.

$$\forall\ x \in \text{node } i \text{ and } y \in \text{node } j\colon W_{ij} = \frac{\sum \partial_{xy}}{n} \quad \text{Eq. 3}$$

In Eq. 3, $W_{ij}$ is the weight of the edge between vertices representing nodes i and j, $\partial_{xy}$ is the aggregate latency between nodes x and y from the (from latency table), and n is the number of such pairs of interacting applications between nodes x and y.

In some implementations, the weighing engine 106 periodically obtains updated information including updated node-wide latency within the cluster. The weighing engine 106 updates aggregate latency values from the latency table between all the containers, and updates the graph based on the updated aggregate latency values. For example, the weighing engine 106 regularly updates the graph 108 based on the new latency values for all the interactions. As any transient system changes with new applications coming on different nodes from time to time, the weighing engine 106 will update and reflect new values. The weighing engine 106 can update the edge values with the same exponential smoothening logic as described above with reference to latency collection. The graph, therefore, represents the state of the cluster with respect to latencies and interactions at any given instant and will be used by a recommendation engine (described later) to generate replication strategies.

In some implementations, the system 100 groups nodes within the cluster based on latencies of interactions between nodes. The system 100 includes a recommendation engine 110 that can receive the graph 108 generated by the weighing engine 106 as an input and group the nodes. In some implementations, the recommendation engine 110 groups the nodes with low latency together. The recommendation engine 110 generates multiple such sets of nodes (called node groups), which are significantly close to each other such that replication within any one of them will be sufficient. The nodes are considered to be significantly close to each other if a difference in total latency incurred among the application interactions between the nodes is insignificant (e.g., the total latency is on the order of milliseconds, microseconds, or nanoseconds, more particularly, between 1 and 100 milliseconds, 1 and 100 microseconds, or 1 and 100 nanoseconds). The node groups also help users understand the infrastructure with respect to network barriers. In some implementations, the recommendation engine 110 can group the nodes within the cluster with the latency less than a threshold latency level. To do so, the recommendation engine 110 can (a) identify a first among multiple nodes, (b) identify neighboring nodes connected to the first node by respective edges and forming a node group by including the first node and selecting the node among all the neighboring nodes that has the lowest weight of edge with the first node, and an edge to the at least one of the neighboring nodes is lower than a highest edge between any two nodes in the node group. Example operations implemented by the recommendation engine 110 to form node groups are described with reference to FIG. 2.

Figure 2:
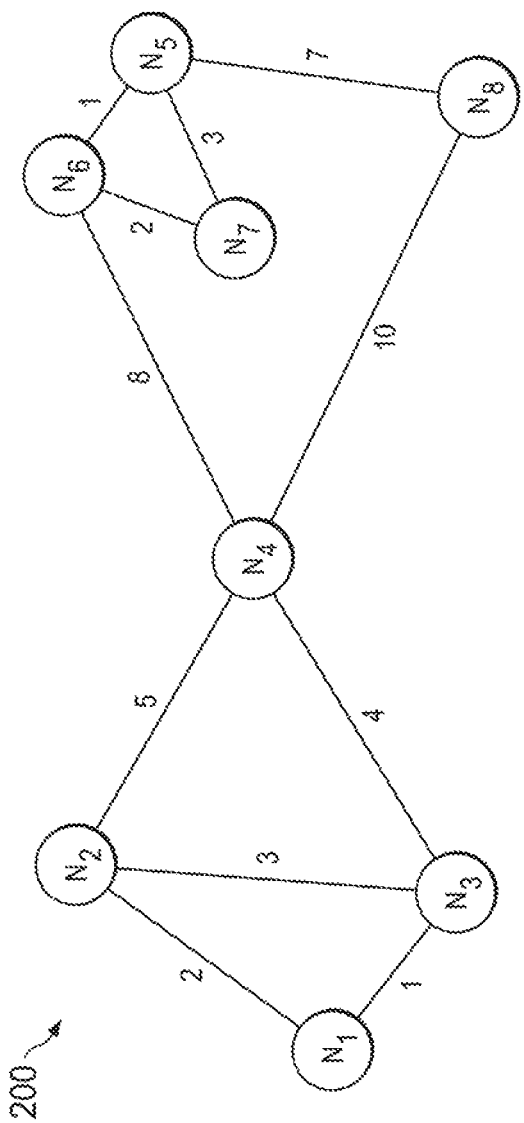
FIG. 2 is an example of an undirected graph generated by the system of FIG. 1.

FIG. 2 is an example of an undirected graph 200 that can be generated by the system of FIG. 1. The graph 200 includes eight nodes (N1, N2, N3, N4, N5, N6, N7, N8). FIG. 2 shows the edges connecting the nodes. The number adjacent each edge (i.e., the edge weight) is the aggregate latency, as described above, For example, the latency for an interaction between N1 and N2 is 30 MS on average, considering historical data. The weighing engine 106 can generate the graph 200 by executing similar operations to those executed to generate the graph 108. In some implementations, the system 100 includes a recommendation engine 110 that groups the nodes as described below. As described above, the recommendation engine 110 uses the graph 200 prepared by the weighing engine 106 to form node groups. To do so, the recommendation engine 110 forms node groups by starting at a first node in the cluster and including unvisited neighboring nodes successively. In a node group, a neighboring node is one that is connected to the first node or to another node that has been included in the node group. For an individual node, a neighboring node is a directly connected node. An unvisited node is a node that has not been considered for inclusion in the node group. The recommendation engine 110 maintains a log of highest edge weight (i.e., a latency between the two nodes). The recommendation engine 110 includes the node and a neighboring node in the node group subject to the following constraints: (i) if the first node is connected to multiple nodes, then the node with the least edge weight, and (ii) an unvisited, neighboring node can be added to the node group only if the edge weight of that node is lower than the maximum edge weight already in the node group. After evaluating a node for inclusion in the node group, the recommendation engine 110 checks if additional, unvisited, neighboring nodes are available for further evaluation. If yes, then the recommendation engine 110 repeats the evaluation described here to continue forming the first node group. If no, then the recommendation engine 110 moves to the next unvisited node and repeats the evaluation to form a second node group. The recommendation engine 110 repeats these steps until no unvisited nodes remain.

Examples of forming node groups are described here with reference to the graph 200. In particular, techniques that the recommendation engine 110 implements to form node groups starting from nodes N1, N2 and N4 are described. The recommendation engine 110 can implement similar techniques to form node groups starting from the other nodes. More generally, the recommendation engine 110 can implement similar techniques to form node groups starting from each node in any node cluster.

Example 1—Forming Node Groups Starting from Node 1 (N1)

The recommendation engine 110 begins the evaluation from Node 1 (N1). The recommendation engine 110 determines that the unvisited, neighboring nodes of N1 are Node 2 (N2) and Node 3 (N3), with edge weights of 2 and 1, respectively. Because the edge weight between N1 and N3 (1) is the lowest, the recommendation engine 110 includes N1 and N3 in the first node group (N1, N3). Next, the recommendation engine 110 identifies unvisited, neighboring nodes of the nodes in the first node group, namely, N2 (neighbor of N3) and N4 (neighbor of N3). Further, the recommendation engine 110 determines that the edge weight between N1 and N2 (2) and the edge weight between N3 and N4 (4) is greater than the maximum edge weight already in the group (1 between N1 and N3). Consequently, the recommendation engine 110 does not include N2 and N4 from the first node group. Subsequently, the recommendation engine 110 determines that no more unvisited, neighboring nodes remain for the nodes in the first node group. Accordingly, the recommendation engine 110 forms the first node group as (N1, N3).

The recommendation engine 110 continues the evaluation by moving to N2. The recommendation engine 110 determines that the unvisited, neighboring nodes of N2 is only N4 because N1 and N3 have previously been visited to form the first node group. Accordingly, the recommendation engine 110 forms the second node group as (N2, N4).

The recommendation engine 110 continues the evaluation by moving to the next node, namely, Node 5 (N5). Note that the recommendation engine 110 excludes N3 and N4 because these nodes are no longer unvisited. The recommendation engine 110 determines that the unvisited, neighboring nodes of N5 are Node 6 (N6), Node 7 (N7) and Node 8 (N8). Because the edge weight between N5 and N6 (1) is the lowest, the recommendation engine 110 includes N5 and N6 in the third node group (N5, N6). Next, the recommendation engine 110 identifies unvisited, neighboring nodes of the nodes in the third node group, namely, N7 (neighbor of N6). Further, the recommendation engine 110 determines that the edge weight between N6 and N7 (2) is greater than the maximum edge weight already in the group (1 between N5 and N6). Consequently, the recommendation engine 110 excludes N7 from the third node group. Subsequently, the recommendation engine 110 determines that no more, unvisited neighboring nodes remain for the nodes in the third node group. Accordingly, the recommendation engine 110 forms the third node group as (N5, N6). At this point, the recommendation engine 110 determines that N7 and N8 are not included in any node group and also cannot be grouped with each other because they are not directly connected. Consequently, the recommendation engine 110 forms a fourth node group including only N7 and a fifth node group including only N8.

The recommendation engine 110 generates a node group list that includes all the node groups that could be formed starting from N1.

Example 2—Forming Node Groups Starting from N2

The recommendation engine 110 begins the evaluation from N2. The recommendation engine 110 determines that the unvisited, neighboring nodes of N2 are N1, N3 and N4 with edge weights of 2, 3 and 4, respectively. Because the edge weight between N2 and N1 is the lowest, the recommendation engine 110 includes N2 and N1 in a first node group (N2, N1). Next, the recommendation engine 110 identifies neighboring nodes of the nodes in the first node group, namely, N3 (neighbor of N1) and N4 (neighbor of N2). Further, the recommendation engine 110 determines that the edge weight between N3 and N1 (1) is less than the maximum edge weight already in the group (2 between N2 and N1). The recommendation engine 110 also determines that the edge weight between N3 and N4 (4) is greater than the maximum edge weight already in the group. Consequently, the recommendation engine 110 includes N3 but excludes N4 from the second node group. Subsequently, the recommendation engine 110 determines that no more unvisited, neighboring nodes remain for the nodes in the first node group. Accordingly, the recommendation engine 110 forms the first node group as (N2, N1, N3).

The recommendation engine 110 continues the evaluation by moving to the next node, namely, node 4. Note that the recommendation engine 110 excludes nodes N1 and N3 because these nodes are no longer unvisited. The recommendation engine 110 determines that the unvisited, neighboring nodes of N4 are N6 and N8 with edge weights of 8 and 10, respectively. Because the edge weight between N4 and N6 is the lowest, the recommendation engine 110 includes N4 and N6 in the second node group (N4, N6). Next, the recommendation engine 110 identifies neighboring nodes of the nodes in the second node group, namely, N5 and N7 (neighbors of N4). Further, the recommendation engine 110 determines that the edge weight between N6 and N5 (1) and that between N6 and N7 (2) are both lower than the maximum edge weight already in the group (8 between N4 and N6). Consequently, the recommendation engine 110 includes N5 and N7 in the second group. Subsequently, the recommendation engine 110 determines that no more, unvisited, neighboring nodes remain for the nodes in the second group. Accordingly, the recommendation engine 110 forms the second node group as (N4, N6, N5 and N7). At this point, the recommendation engine 110 determines that N8 is not included in any node group. Consequently, the recommendation engine 110 forms a third node group including only N8.

The recommendation engine 110 adds all the node groups that could be formed starting from N2 to the node group list.

Example 3—Forming Node Groups Starting from N4

The recommendation engine 110 begins the evaluation from N4. The recommendation engine 110 determines that the unvisited neighboring nodes of N4 are N2, N3, N6 and N8 with edge weights of 5, 4, 8 and 10, respectively. Because the edge weight between N4 and N3 is the lowest, the recommendation engine 110 includes N4 and N3 in a first node group (N4, N3). Next, the recommendation engine 110 identifies neighboring nodes of the nodes in the first node group, namely, N1 and N2 (neighbors of N3). Further, the recommendation engine 110 determines that the edge weight between N3 and N1(1) and that between N3 and N2 (3) is less than the maximum edge weight already in the group (4 between N4 and N3). Consequently, the recommendation engine 110 includes N1 and N2 in the first node group. Subsequently, the recommendation engine 110 determines that no more, unvisited, neighboring nodes remain for the nodes in the first group. Accordingly, the recommendation engine 110 forms the first node group as (N4, N3, N1, N2).

The recommendation engine 110 continues the evaluation by moving to the next node, namely, N5. Note that the recommendation engine 110 excludes N1, N2 and N3 because these nodes are no longer unvisited. The recommendation engine 110 determines that the unvisited, neighboring nodes of N5 are N6, N7 and N8. Because the edge weight between N5 and N6 is the lowest, the recommendation engine 110 includes N5 and N6 in the second node group. Next, the recommendation engine 110 identifies neighboring nodes of the nodes in the second node group, namely, N4 and N7 (neighbors of N6). The recommendation engine 110 excludes N4 from evaluation because it is no longer unvisited. The recommendation engine 110 determines that the edge weight between N6 and N7 (2) is greater than the maximum edge weight already in the group (1 between N5 and N6). Consequently, the recommendation engine 110 excludes N7 from the second node group. Accordingly, the recommendation engine 110 forms the second node group as (N5, N6). At this point, the recommendation engine 110 determines that N7 and N8 are not included in any node group and also cannot be grouped with each other because they are not directly connected. Consequently, the recommendation engine 110 forms a third node group including only N7 and a fourth node group including only N8.

The system continues to traverse through each node in the cluster to form node groups in the manner explained above. For an additional illustration, the formation of a node group starting from Node 8 (N8) is explained here. The system begins evaluation from N8. The system determines that the unvisited, neighboring nodes of N8 are N4 and node 5 (N5) with edge weights of 10 and 7, respectively. Because the edge weight between N8 and N5 is the lowest, the system includes N8 and N5 in the node group (N8, N5). Next, the system identifies neighboring nodes of the nodes in the node group, namely, N7 and N5 (neighbors of N5). Further, the system determines that the edge weight between N5 and N7 (3) and that between N5 and N6 (1) is less than the maximum edge weight already in the group (7 between N8 and N5). Consequently, the system includes N7 and N6 in the node group.

The recommendation engine 110 adds all the node groups that could be formed starting from N4 to the node group list. FIG. 3 is an example of a node group list 300 including multiple groups of nodes generated by the recommendation engine 110 of FIG. 1.

For each node group in the node group list 300, the recommendation engine 110 determines a ratio called a latency ratio. The latency ratio is used to evaluate the proximity of nodes to each other via mathematical constructs. The recommendation engine 110 can implement any mechanism to achieve this objective as an alternative to or in addition to a ratio determination described here. The recommendation engine 110 determines the ratio by dividing a sum of edges within nodes in the node group by a sum of edges to nodes outside the node group that are connected to nodes within the node group. In some implementations, the recommendation engine 110 determines a latency ratio using Eq. 4.

$$\text{Latency } Ratio_k = \frac{\sum W_i}{\sum W_e}$$

In Eq. 4, $W_i$ is an edge with both vertices present in the node group k, and $W_e$ is an edge with exactly one vertex present in the node group k. FIG. 4 is an example of a table 400 showing latency ratios of node groups in the node group list of FIG. 3. The node group (N1, N3) has only one edge to nodes within the group (N1 to N3) and the weight of that edge is 1. The node group (N1, N3) has three edges outside the group (N1 to N2, N3 to N2 and N3 to N4) and weight of the three edges is 2 (N1 to N2), 3 (N3 to N2) and 4 (N3 to N4), respectively. The latency ratio for the group (N1, N3), then, is 1/9. The recommendation engine 110 can calculate the latency ratio for each node group in the node group list and store the latency ratios, for example, as a look-up table.

After determining the latency ratios for all the node groups in the node group list, the system 100 groups nodes within the cluster with a latency less than a threshold latency level. To do so, the system 100 identifies a node group with the lowest ratio among the multiple node groups in the node group list. A lower latency ratio for a node group means that the nodes have low latency within the contained nodes, and vice versa. In some implementations, from among all the node groups, the system 100 identifies node groups such that each node (vertex) is obtained exactly once (the "exactly once" condition). The system 100 obtains the total latency ratio of the configuration by adding the latency of individual node groups. The system 100 identifies different combinations of node groups such that the "exactly once" condition is met, and returns the configuration with the least total latency ratio. If the system 100 determines that two combinations have similar ratio (after rounding off to most significant digits in consideration), then the system 100 can select the one with lesser node groups. When the techniques for identifying a node group are implemented by the system 100 on the node groups in the node group list 400, the following two combinations yield almost similar results:

(N1, N3)(N2, N4)(N5, N6)(N7)(N8)≈0.35—Node Group I (N1, N2, N3, N4)(N5, N6)(N7)(N8)≈0.35—Node Group II For this example, the system 100 identifies Node Group II as the preferred node group because it has fewer number of groups (4 groups) compared to Node Group I (5 groups).

In some implementations, the system 100 provides the identified grouped nodes with latencies less than the threshold latency level. The grouped nodes are schematically shown in FIG. 1 in table 112. For illustrative purposes, the table 112 includes two node groups (Group 1, Group 2) and the nodes in each group (nodes 1, 2, 3 in Group 1, nodes 4, 5 in Group 2). For example, the system 100 can display the identified grouped nodes in a display device. Such presentation of the grouped nodes is a recommendation to a user to replicate their services with one replica in each of the grouped nodes for optimized network performance. In some implementations, the system 100 can present the grouped nodes via the graphic user interfaces described with reference to FIGS. 5A-5D.

Figure 5A:
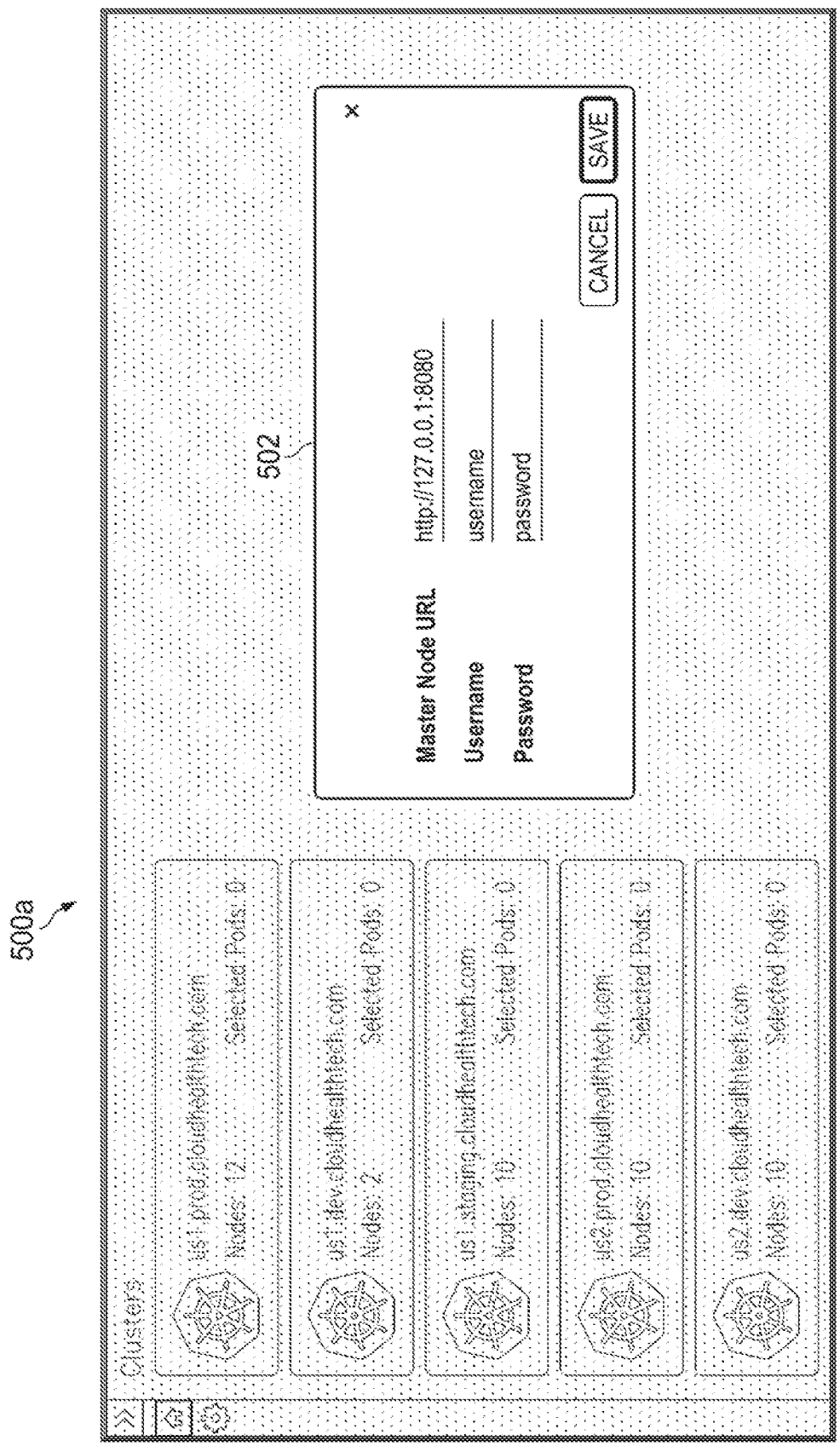
FIGS. 5A-5E are schematic user interfaces using which an application can be allocated to a node group included in the node group list of FIG. 3.
Figure 5B:
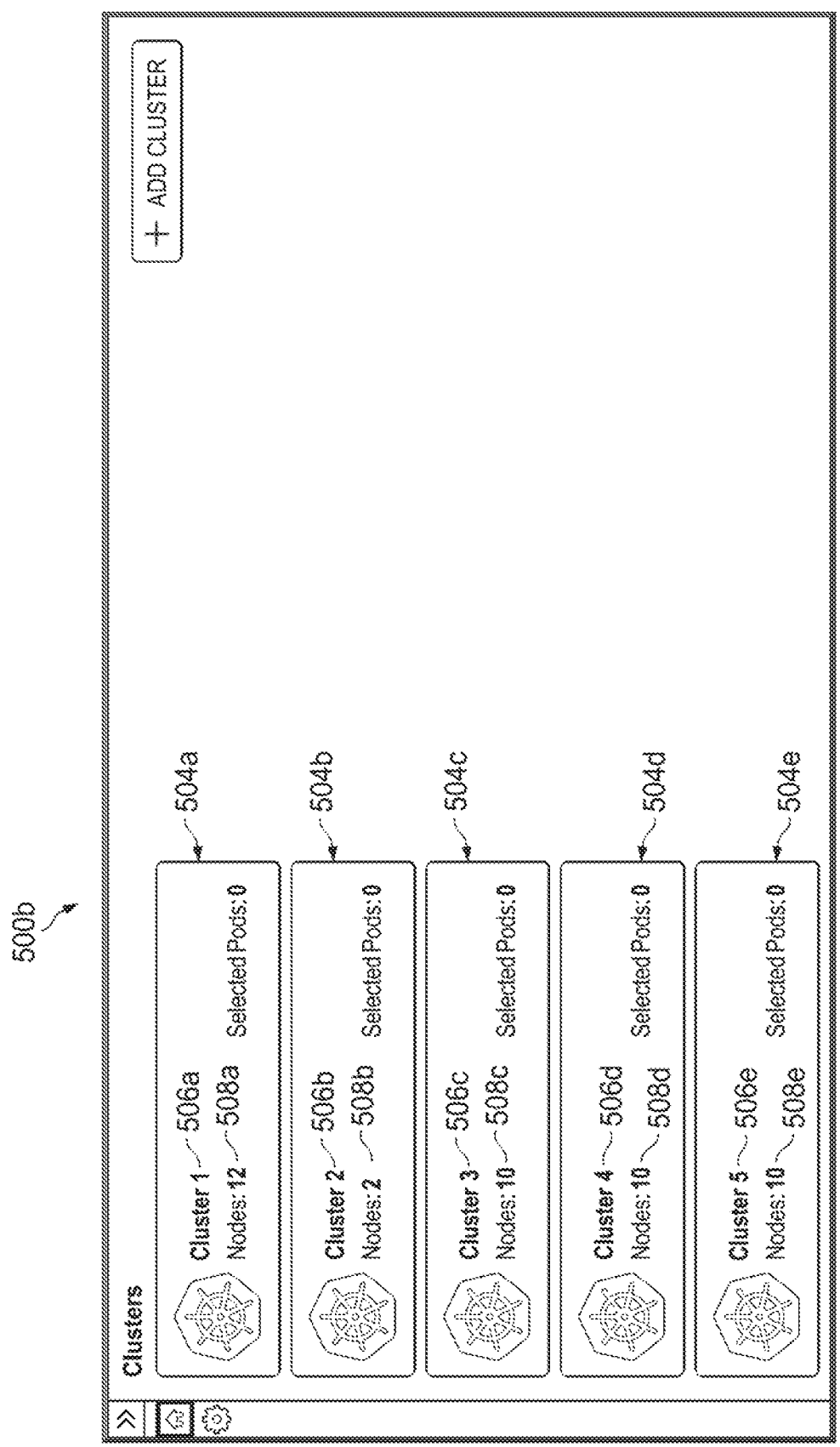

FIGS. 5A-5D are schematic user interfaces using which an application can be allocated to a node group included in the node group list of FIG. 3. FIG. 5A shows a user interface 500a which is a landing page using which a user can add clusters and see clusters that the user has configured. The user interface 500a includes a login screen 502 to grant authorized users access to the system 100. FIG. SB shows a user interface 500b which is displayed to a user who has been granted access to the system 100. The user interface 500b includes objects, (objects 504a, 504b, 504c, 504d, 504e), each of which identifies the multiple clusters that are available and/or have been configured. Each object that identifies an available cluster includes a cluster identifier (identified by reference numerals 506a, 506b, 506c, 506d, 506e) and a number of nodes available in each cluster (identified by reference numerals 508a, 508b, 508c, 508d, 508e). Each cluster identifier is a selectable object. The user interface 500b can receive a selection of a cluster identifier using an input device.

Figure 5C:
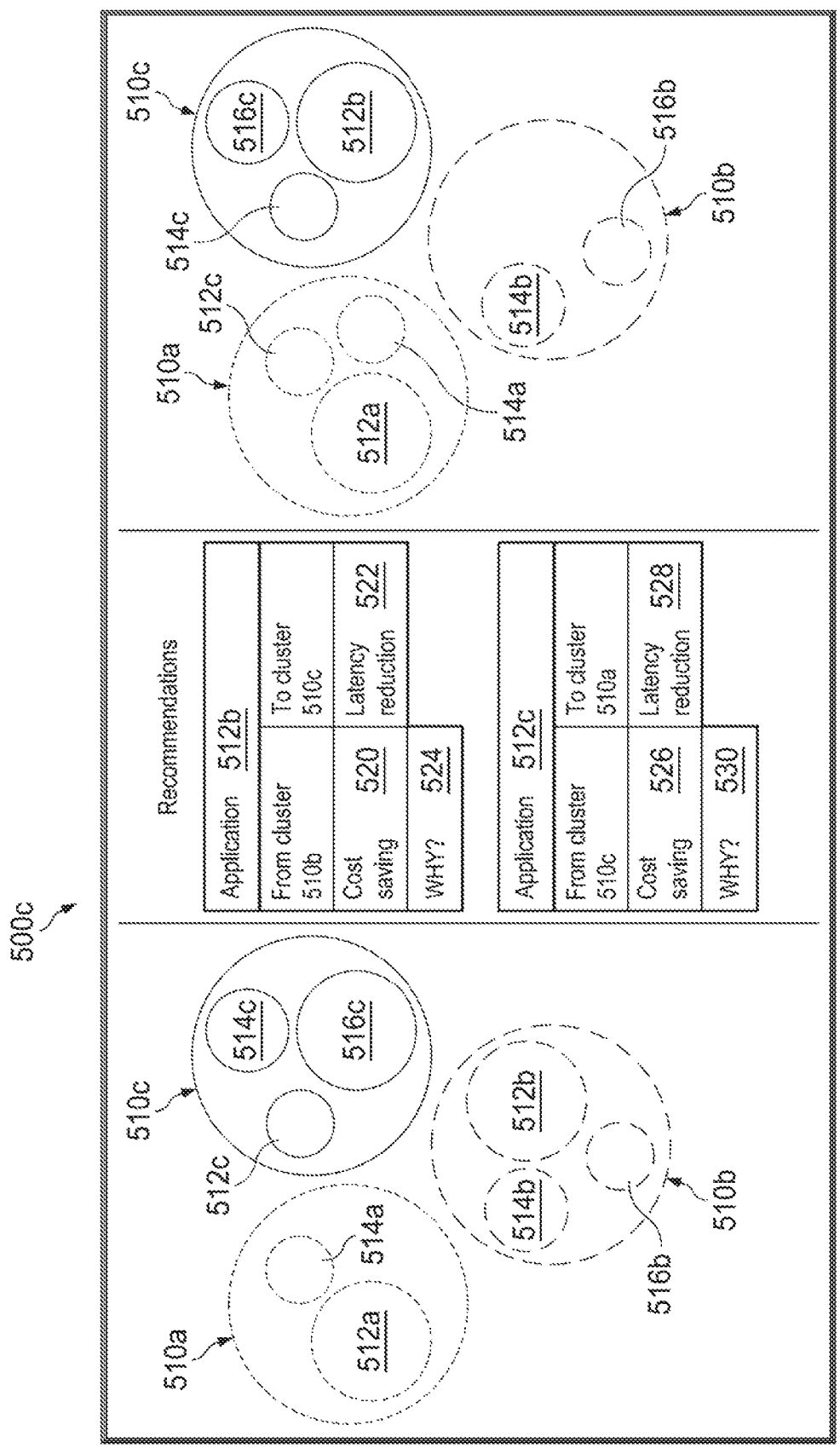

Once the system 100 receives selections, the system 100 invokes the recommendation engine 110. As described above, the output of the recommendation engine 110 is the set of nodes which are close to each other in terms of network interactions. FIG. 5C shows a user interface 500c that shows the output of the recommendation engine 110. The user interface 500c visually presents the underlying heterogeneity in the infrastructure to the user and also gives the user an idea about where services need to be replicated for better performance. In some implementations, the recommendation engine 110 can also show recommendations to migrate applications from one node to another so that the user can get better response time and cost benefits instead of replication.

For example, in the user interface 500c, the recommendation engine 110 shows three objects representing three clusters (clusters 510a, 510b, 510c), respectively. Within each object representing a cluster of containers, the recommendation engine 110 shows an object or objects that each represents an application executed by the containers in the cluster. For example, the cluster 510a executes two applications (applications 512a, 514a). Therefore, within the object representing cluster 510a, the recommendation engine 110 shows two objects representing applications 512a and 514a, respectively. The cluster 516b executes three applications (applications 512b, 514b, 516b). Therefore, within the object representing cluster 501b, the recommendation engine 110 shows three objects representing applications 512b, 514b and 516b, respectively. The cluster 510c also executes three applications (applications 512c, 514c, 516c). Therefore, within the object representing cluster 510c, the recommendation engine 110 shows three objects representing applications 512c, 514c and 516c, respectively. In some implementations, the recommendation engine 110 shows the current clusters and the applications being executed by the clusters in a portion of the user interface 500c (e.g., on the left side of the user interface 500c).

By executing the techniques described in this disclosure, the recommendation engine 110 groups nodes that have latencies less than a threshold latency value. Based on the grouping, the recommendation engine 110 can recommend movement of an application from one cluster to another cluster to save cost and reduce latency. In some implementations, the recommendation engine 110 can display the recommendations in the user interface 500c.

For example, the recommendation engine 110 has determined that application 512b currently executing on cluster 510b can be migrated to cluster 510c. Accordingly, the recommendation engine 110 displays, in a different portion of the user interface 500c, the application that can be migrated (Application 512b), the cluster from which the application can be migrated (cluster 501b) and the cluster to which the application be migrated (cluster 510c). In addition, the recommendation engine 110 can display the cost savings in a first object 522 and the latency reduction in a second object 522. Further, the recommendation engine 110 can display a selectable object 524, the selection of which provides the user with a visual explanation as to why the recommendation is being presented, as described with reference to FIG. 5D.

In another example, the recommendation engine 110 has determined that application 512c currently executing on cluster 510c can be migrated to cluster 510a. Accordingly, the recommendation engine 110 displays, in the user interface 500c, the application that can be migrated (Application 512c), the cluster from which the application can be migrated (cluster 510c) and the cluster to which the application be migrated (cluster 510a). In addition, the recommendation engine 110 can display the cost savings in a third object 526 and the latency reduction in a fourth object 528. Further, the recommendation engine 110 can display another selectable object 530, the selection of which provides the user with a visual explanation as to why the recommendation is being presented.

In another portion of the user interface 500c, the recommendation engine 110 can display the objects representing the clusters 510a, 510b and 510c; this time, assuming that the provided recommendations have been accepted. Thus, in this other portion, the recommendation engine 110 shows that the application 512c has been moved to cluster 510a and the application 512b has been moved to cluster 510c, In this manner, the recommendation engine 110 visually presents a current configuration of clusters and applications being executed by the clusters and a proposed configuration if the recommendations proposed by the recommendation engine 110 are accepted.

Figure 5D:
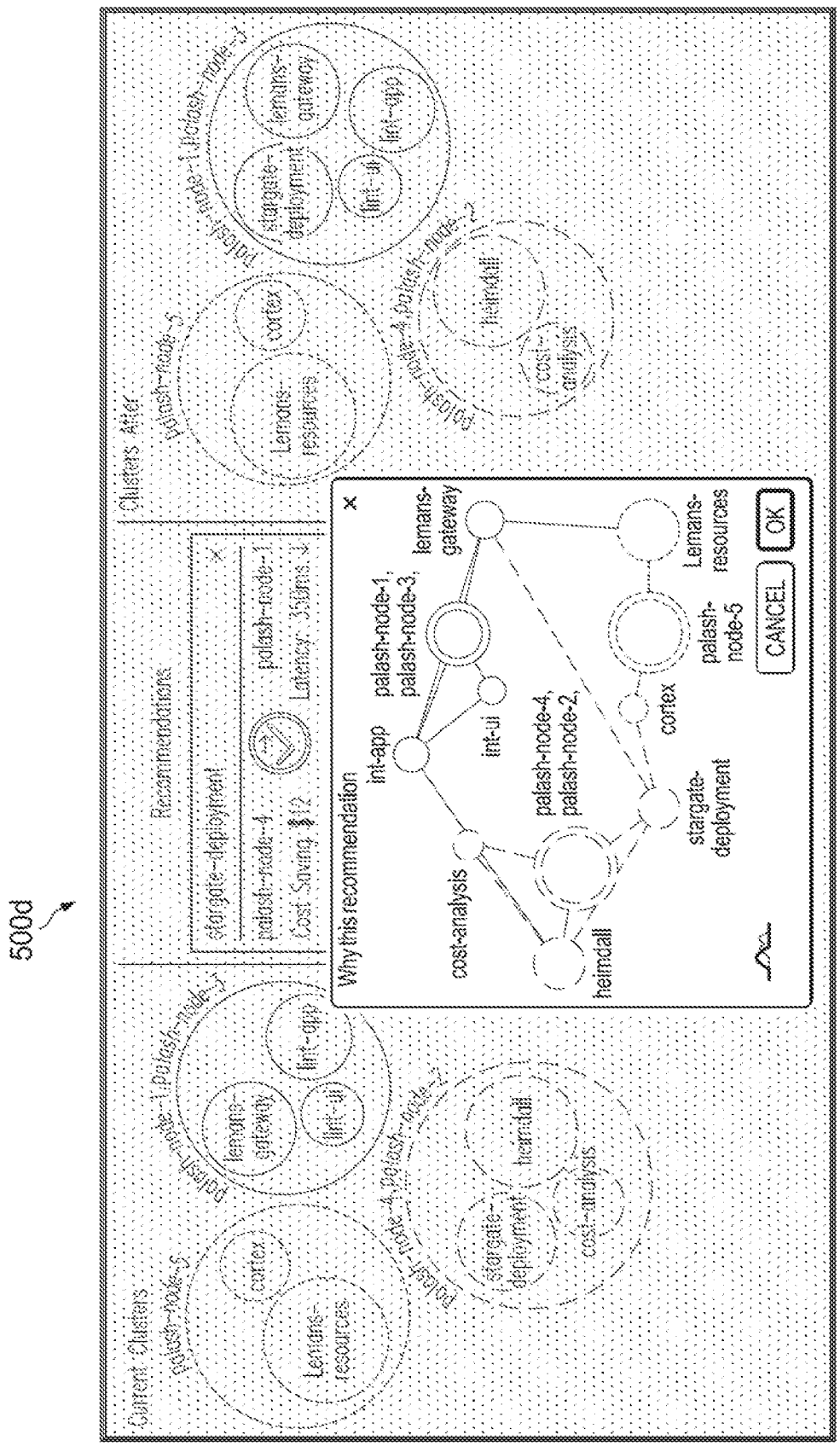
Figure 5E:
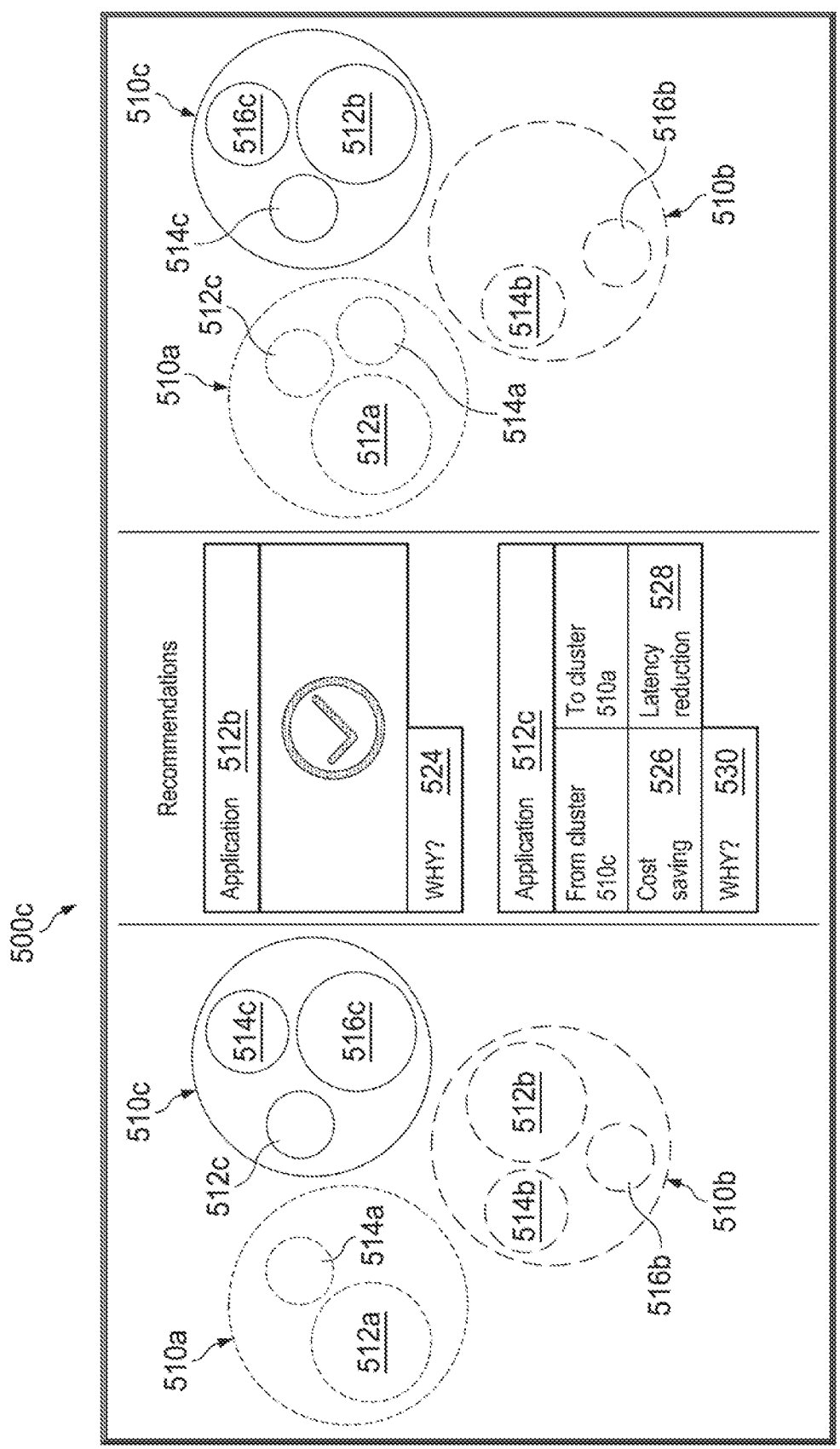

In some implementations, the recommendation engine 110 can receive a request to provide additional explanation for the recommendation. To do so, the user can select the selectable object (e.g., the selectable object 524 or the selectable object 530). In response to detecting a selection of the selectable object, the recommendation engine 110 can present user interface 500d (FIG. 5D). In the user interface 500d, the recommendation engine 110 can display all the node group interactions together with latency values. After viewing the reasons for the recommendation, the user can select an object to close the user interface 500d. In response, the recommendation engine 110 displays user interface 500c. The user can select one (or more or all or none) of the recommendations displayed in the user interface 500c. In response, the recommendation engine 110 can display a check mark over the selected recommendation and migrate the application in accordance with the selected recommendation.

Figure 6:
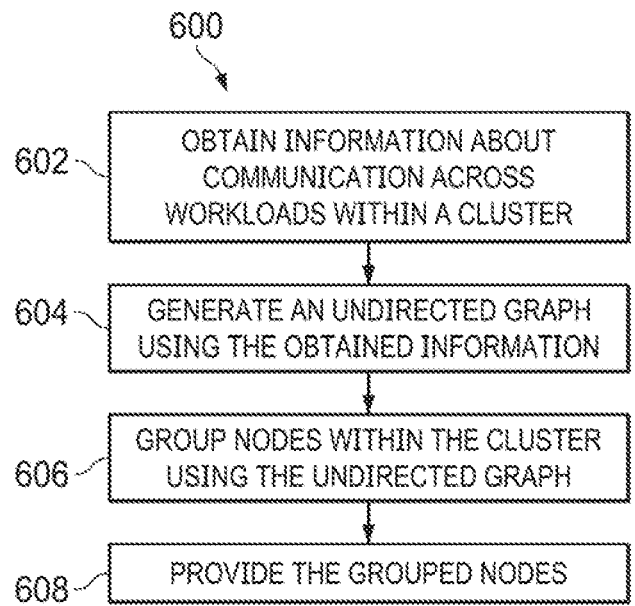
FIG. 6 is a flowchart of an example of a process of grouping nodes based on latency.

FIG. 6 is a flowchart of an example of a process 600 of grouping nodes based on latency. The process 600 can be executed by one or more or all components of the system 100 described above. At 602, information about communication across workloads within a cluster of containers implemented by an operating environment is obtained. For example, the interaction counters 102 and the latency monitors 104 obtain information about communication across workloads within the cluster implemented by the orchestrator using techniques described above. The information identifies multiple pairs of containers. Each pair includes a network source container and a corresponding network destination container. The information includes, for each pair of containers, a corresponding latency associated with a network call between the network source container and the corresponding network destination container. At 604, an undirected graph is generated using the obtained information. For example, the weighing engine 106 generates the undirected graph using the information obtained by the interaction counters 102 and the latency monitors 104 using techniques described above. The undirected graph represents a node-wide latency within the cluster. At 606, using the undirected graph, nodes within the cluster with a latency less than a threshold latency level are grouped. For example, the system 100 groups nodes within the cluster that have the lowest latency using techniques described above. At 608, grouped nodes with latencies less than the threshold latency level are provided. For example, the recommendation engine 110 provides the grouped nodes using techniques described above.

Figure 7:
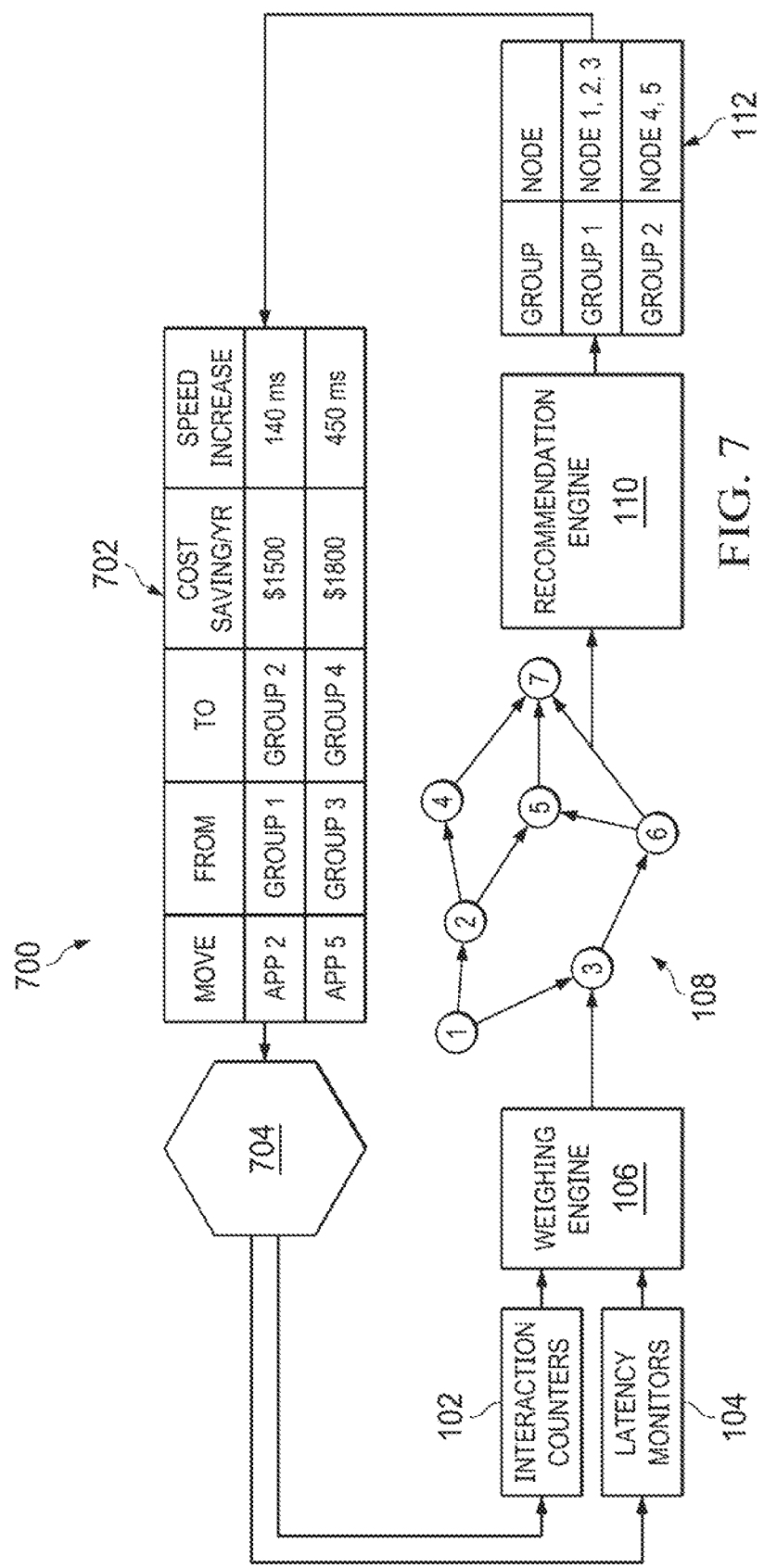
FIG. 7 is an example of a system that monitors services across multiple nodes using the system of FIG. 1.

In some implementations, the system 100 receives input to execute by the grouped nodes, workload currently being executed by another, different set of nodes. For example, recognizing that the grouped nodes have a lower latency than the other set of nodes, a user can provide input to execute the workload on the grouped nodes. In response, the system 100 replicates the workload on the grouped nodes and then ceases to execute the workload on the other set of nodes. The workload is now executed by nodes with a lower latency, FIG. 7 is an example of a system 700 that monitors services across multiple nodes using the system of FIG. 1. The system 700 includes all components of FIG. 1 and implements each component as described above. Using the grouped nodes shown in table 112, the system 700 determines a migration recommendation table 702 as described above with reference to FIGS. 5A-5E. Based on recommendations accepted or rejected by the user, the system 700 coordinates deployment and configurations of applications across the clusters using a distributed computing environment that includes an example orchestrator 704. The orchestrator 704 can be implemented using, for example, a Kubernetes® cluster orchestration system server for container service orchestration, a VMware Cloud Automation server for orchestration of VM-based services, and/or any other suitable orchestration service. The system 700 tracks interactions and latency and provides the interaction count and latencies to the weighing engine 106, as described above with reference to FIG. 1.

Figure 8:
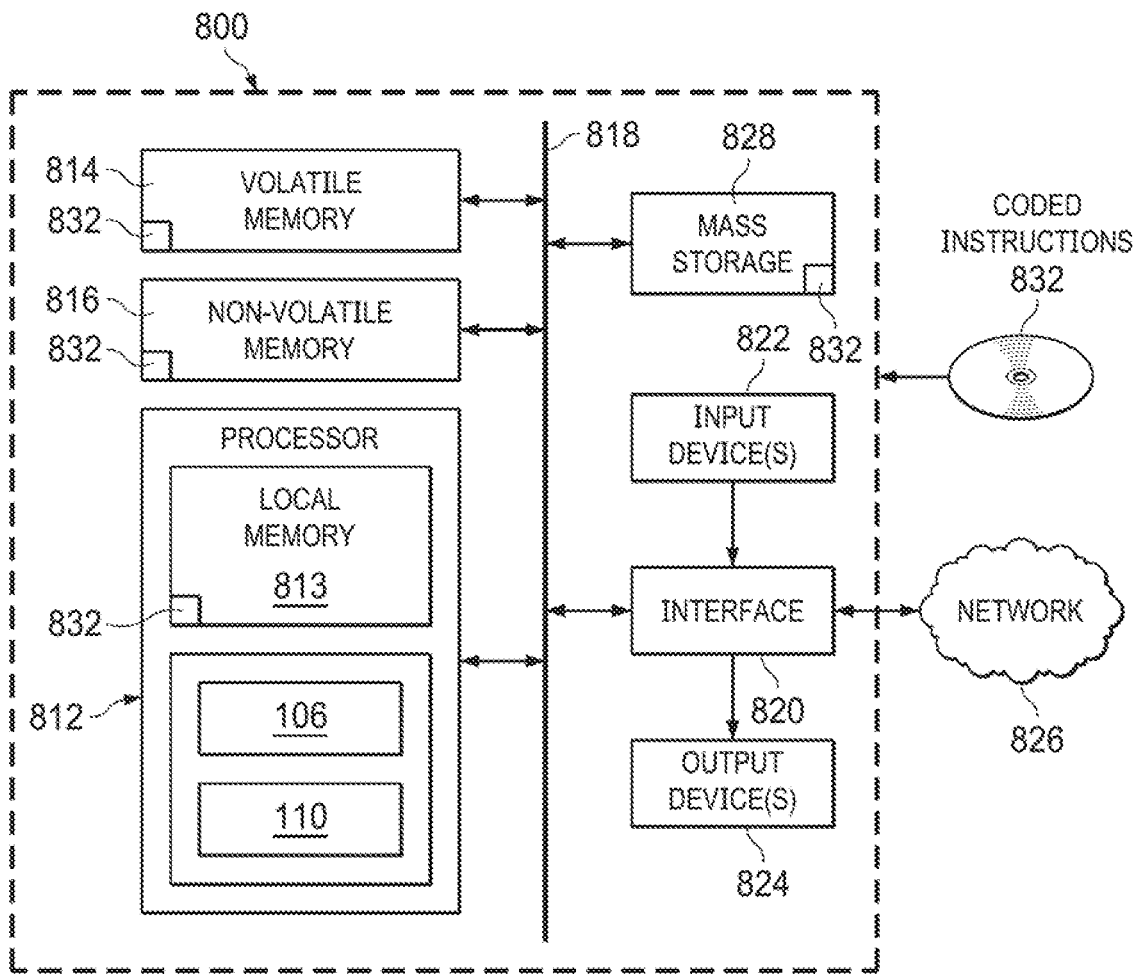
FIG. 8 is a block diagram of an example of a processing platform.

FIG. 8 is a block diagram of an example of a processing platform 800 configured to execute the techniques described in this disclosure, specifically, the methods described above with reference to FIG. 1 and FIG. 7. The processor platform 800 can be, for example, a server, a personal computer, a workstation, a self-learning machine (e.g., a neural network), a mobile device (e.g., a cell phone, a smart phone, a tablet computer), a personal digital assistant (PDA), an Internet appliance, or any other type of computing device. In some implementations, the processor 812 implements the interaction count collector 122

The processor platform 800 includes a process 812, which is hardware, For example, the processor 812 can be implemented by one or more integrated circuits, logic circuits, microprocessors, graphics processing units (GPUs), digital signal processors (DSPs), or controllers. The hardware processor 812 can be a semiconductor, e.g., silicon, based device. The hardware processor 812 can implement the components of the systems (for example, system 100, system 700) described with reference to FIGS. 1 and 7 including, for example, the weighing engine 106 and the recommendation engine 110.

The processor 812 includes a local memory 813 (e.g, a cache). The process 812 is in communication with a main memory including a volatile memory 814 and a non-volatile memory 816 via a bus 818, The volatile memory 814 can be implemented by synchronous dynamic random access memory (SDRAM), dynamic random access memory (DRAM) or other type of random access memory device. The non-volatile memory 816 can be implemented by flash memory and/or any other desired type of memory device. A memory controller controls access to the main memory 814, 816.

The process platform 800 also includes an interface circuit 820 implemented by any type of interface standard, for example, an Ethernet interface, a universal serial bus (USB), a wired or wireless interface, a near field communication (NFC) interface and/or a PCI express interface. One or more input devices 822 are connected to the interface circuit 820. The input devices permit a user to enter data and/or commands to the processor 812. The input devices can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820. The output devices 824 can be implemented, for example, by display devices, e.g., light emitting diode (LED), an organic LED (OLED), a liquid crystal display (LCD), a cathode ray tube display (CRT), an in-place switching (IPS) display, a touchscreen, etc. and/or a tactile output device, a printer and/or speaker. The interface circuit 820 typically includes a graphics driver card, a graphics driver chip and/or a graphics driver processor.

The interface circuit 820 also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 also includes one or more mass storage devices 828 for storing software and/or data. Examples of such mass storage devices 828 include floppy disk drives, hard disk drives, compact disk drives, redundant array of independent disks (RAID) systems, digital versatile disk (DVD) drives, or combinations of them.

Machine executable instructions 832 represented by the flowchart of FIG. 6 can be stored in the mass storage device 828, in the volatile memory 814, in the non-volatile memory 816, and/or on a removable non-transitory computer readable storage medium such as a CD or DIV.

Certain aspects of the subject matter described in this method can be implemented as a method by one or more processors, e.g., one or more hardware processors. information about communication across workloads within a cluster of containers implemented by an operating environment are obtained. The information identifies multiple pairs of containers. Each pair includes a network source container and a corresponding network destination container. The information includes, for each pair of containers, a corresponding latency associated with a network call between the network source container and the corresponding network destination container. An undirected graph is generated using the obtained information. The undirected graph represents a node-wide latency within the cluster. Using the undirected graph, nodes within the cluster with a latency less than a threshold latency level are grouped. Grouped nodes with latencies less than the threshold latency level are provided.

An aspect taken alone or combinable with any of the other aspects includes the following features. The undirected graph includes multiple nodes and multiple edges connecting the multiple nodes. A node represents a container and an edge connecting two nodes represents a latency incurred by applications executed by the operating environment when interacting between the two nodes.

An aspect taken alone or combinable with any of the other aspects includes the following features. To group the nodes within the cluster with the latency less than the threshold latency level, (a) a first node among the multiple nodes is identified, (b) neighboring nodes connected to the first node by respective edges are identified, and (C) a node group is formed that includes the first node and at least one of the neighboring nodes such that an edge between the first node and the at least one of the neighboring nodes is the lowest, and an edge to the at least one of the neighboring nodes is lower than a highest edge between any two nodes in the node group.

An aspect taken alone or combinable with any of the other aspects includes the following features. Multiple node groups are formed by repeating steps (a), (b) and (c) for each node within the cluster. For each node group, a corresponding ratio is determined by dividing a sum of edges within nodes in the node group by a sum of edges to nodes outside the node group that are connected to nodes within the node group.

An aspect taken alone or combinable with any of the other aspects includes the following features. To group nodes within the cluster with a latency less than a threshold latency level, a node group with the lowest ratio among the multiple node groups is identified.

An aspect taken alone or combinable with any of the other aspects includes the following features. To generate the undirected graph, latency values are identified from a latency table between all containers, and containers are grouped based on the latency values.

An aspect taken alone or combinable with any of the other aspects includes the following features. Updated information that includes updated node-wide latency is periodically obtained within the cluster. The latency values from the latency table between all the containers are updated, and the undirected graph is updated based on the updated latency values.

An aspect taken alone or combinable with any of the other aspects includes the following features. Input to execute a workload on the grouped nodes is received. The workload is being executed by another, different set of nodes. In response to receiving the input, the workload is replicated on the grouped nodes. After replicating the workload on the grouped nodes, the workload is ceased to be executed on the other set of nodes. The workload is then executed on the grouped nodes.

Certain aspects of the subject matter described in this disclosure can be implemented as a non-transitory computer-readable medium storing instructions which, when executed by a hardware-based processor, performs operations including the methods described in this disclosure.

Certain aspects of the subject matter described in this disclosure can be implemented as a system that includes one or more processors including a hardware-based processor, and a memory storage including a non-transitory computer-readable medium storing instructions which, when executed by the one or more processors including the hardware-based processor, to perform operations including the methods described in this disclosure.

While this specification contains many specific implementation details, these should not be construed as limitations on the scope of any implementation or on the scope of what may be claimed, but rather as descriptions of features that may be specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In certain implementations, multitasking and parallel processing can be advantageous.

What is claimed is:
1. A method comprising:
    obtaining, by one or more processors, latency information for interactions between a plurality of applications running on a plurality of physical nodes, wherein the latency information comprises a plurality of latency values, wherein each latency value of the plurality of latency values corresponds to a monitored, latency associated with a network communication performed between a corresponding pair of applications of the plurality of applications;

generating, by the one or more processors, an undirected graph using the obtained latency information, wherein the undirected graph comprises a plurality of vertices representing the plurality of physical nodes and a plurality of edges connecting the plurality of vertices, wherein each edge of the plurality of edges, is between a pair of vertices of the plurality of vertices and is associated with a weight that is based on a latency associated with interactions between applications running on the physical nodes represented by the pair of vertices;

identifying, by the one or more processors, a plurality of groups of physical nodes using the undirected graph, wherein each group of physical nodes of the plurality of groups of physical nodes comprises one or more physical nodes of the plurality of physical nodes, and wherein each group of physical nodes of the plurality of groups of physical nodes is identified by traversing at least part of the undirected graph based on the weights associated with the plurality of edges;

selecting, by the one or more processors, one or more groups of physical nodes of the plurality of groups of physical nodes based on latency levels associated with the plurality of groups of physical nodes, wherein the one or more groups of physical nodes are selected such that each of the plurality of physical nodes is in exactly one group of physical nodes of the one or more groups of physical nodes; and presenting, by the one or more processors, the one or more groups of physical nodes.

2. The method of claim 1, wherein the plurality of applications comprise a plurality of containerized applications.

3. The method of claim 1, wherein identifying the plurality of groups of physical nodes comprises:
(a) adding a first physical node of the plurality of physical nodes to a first group of physical nodes of the plurality of groups of physical nodes;
(b) adding, to the first group of physical nodes, a first neighboring physical node of a plurality of neighboring physical nodes connected to the first physical node in the undirected graph based on a first edge connecting the vertices representing the first physical node and the first neighboring physical node having a lowest weight among respective edges connecting the vertices representing the first physical node and the plurality of neighboring physical nodes; and
(c) successively adding one or more additional physical nodes of the plurality of physical nodes to the first group of physical nodes based on one or more vertices representing the one or more additional physical nodes being connected in the undirected graph to at least one vertex representing at least one physical node already in the first group of physical nodes by an edge with a weight that is lower than a maximum weight among one or more edges between vertices representing physical nodes already in the first group of physical nodes.

4. The method of claim 1, wherein:
for each of the plurality of groups of physical nodes, the corresponding associated latency level comprises a corresponding ratio comprising a sum of weights of edges between vertices representing physical nodes in the group of physical nodes divided by a sum of weights of edges connecting vertices representing physical nodes outside the group of physical nodes to vertices representing physical nodes in the group of physical nodes.

5. The method of claim 4, wherein selecting the one or more groups of physical nodes comprises selecting a first group of physical nodes associated with the lowest ratio among the plurality of groups of physical nodes.

6. The method of claim 1, further comprising:
periodically obtaining updated latency information; and
updating the undirected graph based on the updated latency information.

7. The method of claim 1, further comprising:
receiving input to execute a workload on physical nodes of a first group of physical nodes of the one or more groups of physical nodes, wherein the workload is being executed by another, different set of physical nodes; and
in response to receiving the input:
replicating the workload on the physical nodes of the first group of physical nodes,
after replicating the workload on the physical nodes of the first group of physical nodes, ceasing to execute the workload on the other set of physical nodes, and executing the workload on the physical nodes of the first group of physical nodes.

8. A non-transitory computer-readable medium storing instructions which, when executed by a one or more processors, cause the one or more processors to perform operations comprising:
obtaining, by the one or more processors, latency information for interactions between a plurality of applications running on a plurality of physical nodes, wherein the latency information comprises a plurality of latency values, wherein each latency value of the plurality of latency values corresponds to a monitored latency associated with a network communication performed between a corresponding pair of applications of the plurality of applications; p1 generating, by the one or more processors, an undirected graph using the obtained latency information, wherein the undirected graph comprises a plurality of vertices representing the plurality of physical nodes and a plurality of edges connecting the plurality of vertices, wherein each edge of the plurality of edges, is between a pair of vertices of the plurality of vertices and is associated with a weight that is based on a latency associated with interactions between applications running on the physical nodes represented by the pair of vertices;
identifying, by the one or more processors, a plurality of groups of physical nodes using the undirected graph, wherein each group of physical nodes of the plurality of groups of physical nodes comprises one or more physical nodes of the plurality of physical nodes, and wherein each group of physical nodes of the plurality of groups of physical nodes is identified by traversing at least part of the undirected graph based on the weights associated with the plurality of edges;
selecting, by the one or more processors, one or more groups of physical nodes of the plurality of groups of physical nodes based on latency levels associated with the plurality of groups of physical nodes, wherein the one or more groups of physical nodes are selected such that each of the plurality of physical nodes is in exactly one group of physical nodes of the one or more groups of physical nodes; and presenting, by the one or more processors, the one or more groups of physical nodes.

9. The non-transitory computer-readable medium of claim 8, wherein the plurality of applications comprise a plurality of containerized applications.

10. The non-transitory computer-readable medium of claim 8, wherein identifying the plurality of groups of physical nodes comprises:
(a) adding a first physical node of the plurality of physical nodes to a first group of physical nodes of the plurality of groups of physical nodes;
(b) adding, to the first group of physical nodes, a first neighboring physical node of a plurality of neighboring physical nodes connected to the first physical node in the undirected graph based on a first edge connecting the vertices representing the first physical node and the first neighboring physical node having a lowest weight among respective edges connecting the vertices representing the first physical node and the plurality of neighboring physical nodes; and
(c) successively adding one or more additional physical nodes of the plurality of physical nodes to the first group of physical nodes based on one or more vertices representing the one or more additional physical nodes being connected in the undirected graph to at least one vertex representing at least one physical node already in the first group of physical nodes by an edge with a weight that is lower than a maximum weight among one or more edges between vertices representing physical nodes already in the first group of physical nodes.

11. The non-transitory computer-readable medium of claim 8, wherein:
for each of the plurality of groups of physical nodes, the corresponding associated latency level comprises a corresponding ratio comprising a sum of weights of edges between vertices representing physical nodes in the group of physical nodes divided by a sum of weights of edges connecting vertices representing physical nodes outside the group of physical nodes to vertices representing physical nodes in the group of physical nodes.

12. The non-transitory computer-readable medium of claim 11, wherein selecting the one or more groups of physical nodes comprises selecting a first group of physical nodes associated with the lowest ratio among the plurality of groups of physical nodes.

13. The non-transitory computer-readable medium of claim 8, the operations further comprising:
periodically obtaining updated latency information; and
updating the undirected graph based on the updated latency information.

14. The non-transitory computer-readable medium of claim 8, the operations further comprising:
receiving input to execute a workload on physical nodes of a first group of physical nodes of the one or more groups of physical nodes, wherein the workload is being executed by another, different set of physical nodes; and
in response to receiving the input:
replicating the workload on the physical nodes of the first group of physical nodes,
after replicating the workload on the physical nodes of the first group of physical nodes, ceasing to execute the workload on the other set of physical nodes, and executing the workload on the physical nodes of the first group of physical nodes.

15. A system comprising:
one or more processors; and
a memory storing instructions which, when executed by the one or more processors, cause the one or more processors to perform operations comprising:
obtaining, by the one or more processors, latency information for interactions between a plurality of applications running on a plurality of physical nodes, wherein the latency information comprises a plurality of latency values, wherein each latency value of the plurality of latency values corresponds to a monitored, latency associated with a network communication performed between a corresponding pair of applications of the plurality of applications;
generating, by the one or more processors, an undirected graph using the obtained latency information, wherein the undirected graph comprises a plurality of vertices representing the plurality of physical nodes and a plurality of edges connecting the plurality of vertices, wherein each edge of the plurality of edges, is between a pair of vertices of the plurality of vertices and is associated with a weight that is based on a latency associated with interactions between applications running on the physical nodes represented by the pair of vertices;
identifying, by the one or more processors, a plurality of groups of physical nodes using the undirected graph, wherein each group of physical nodes of the plurality of groups of physical nodes comprises one or more physical nodes of the plurality of physical nodes, and wherein each group of physical nodes of the plurality of groups of physical nodes is identified by traversing at least part of the undirected graph based on the weights associated with the plurality of edges;
selecting, by the one or more processors, one or more groups of physical nodes of the plurality of groups of physical nodes based on latency levels associated with the plurality of groups of physical nodes, wherein the one or more groups of physical nodes are selected such that each of the plurality of physical nodes is in exactly one group of physical nodes of the one or more groups of physical nodes; and p2
presenting, by the one or more processors, the one or more groups of physical nodes.

16. The system of claim 15, wherein the plurality of applications comprise a plurality of containerized applications.

17. The system of claim 16, wherein the operations further comprise
periodically obtaining updated latency information; and
updating the undirected graph based on the updated latency information.

18. The system of claim 15, wherein identifying the plurality of groups of physical nodes comprises:
(a) adding a first physical node of the plurality of physical nodes to a first group of physical nodes of the plurality of groups of physical nodes;
(b) adding, to the first group of physical nodes, a first neighboring physical node of a plurality of neighboring physical nodes connected to the first physical node in the undirected graph based on a first edge connecting the vertices representing the first physical node and the first neighboring physical node having a lowest weight among respective edges connecting the vertices representing the first physical node and the plurality of neighboring physical nodes; and (c) successively adding one or more additional physical nodes of the plurality of physical nodes to the first group of physical nodes based on one or more vertices representing the one or more additional physical nodes being connected in the undirected graph to at least one vertex representing at least one physical node already in the first group of physical nodes by an edge with a weight that is lower than a maximum weight among one or more edges between vertices representing physical nodes already in the first group of physical nodes.

19. The system of claim 15, the operations further comprising:

for each of the plurality of groups of physical nodes, the corresponding associated latency level comprises a corresponding ratio comprising a sum of weights of edges between vertices representing physical nodes in the group of physical nodes divided by a sum of weights of edges connecting vertices representing physical nodes outside the group of physical nodes to vertices representing physical nodes in the group of physical nodes.

20. The system of claim 19, wherein selecting the one or more groups of physical nodes comprises selecting a first group of physical nodes associated with the lowest ratio among the plurality of groups of physical nodes.

21. The system of claim 15, the operations further comprising:

receiving input to execute a workload on physical nodes of a first group of physical nodes of the one or more groups of physical nodes, wherein the workload is being executed by another, different set of physical nodes; and in response to receiving the input:
  replicating the workload on the physical nodes of the first group of physical nodes,
  after replicating the workload on the physical nodes of the first group of physical nodes, ceasing to execute the workload on the other set of physical nodes, and
  executing the workload on the physical nodes of the first group of physical nodes.

\* \* \* \* \*